No. 673,345. Patented Apr. 30, 1901.
S. S. WHEELER.
REGULATION OF DYNAMO ELECTRICAL MACHINERY.
(Application filed Sept. 24, 1894.)
(No Model.)
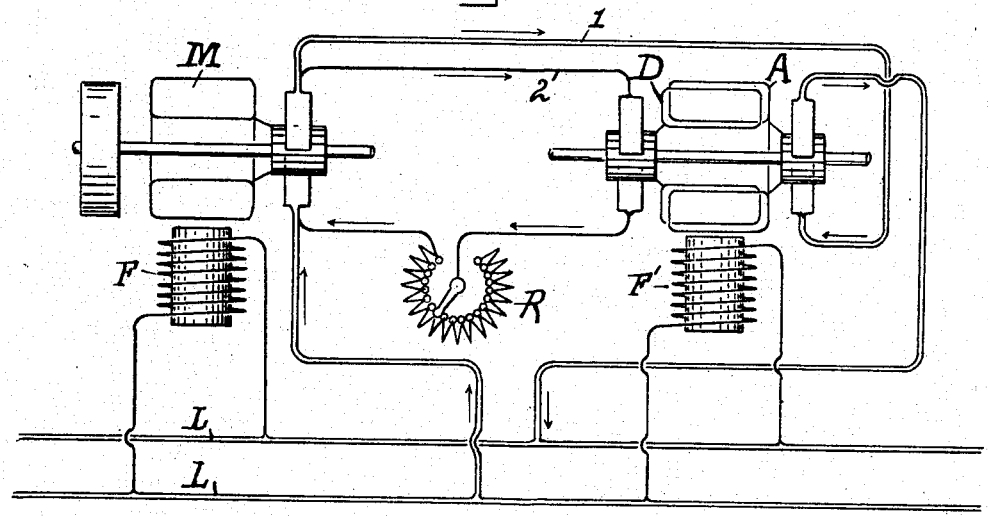
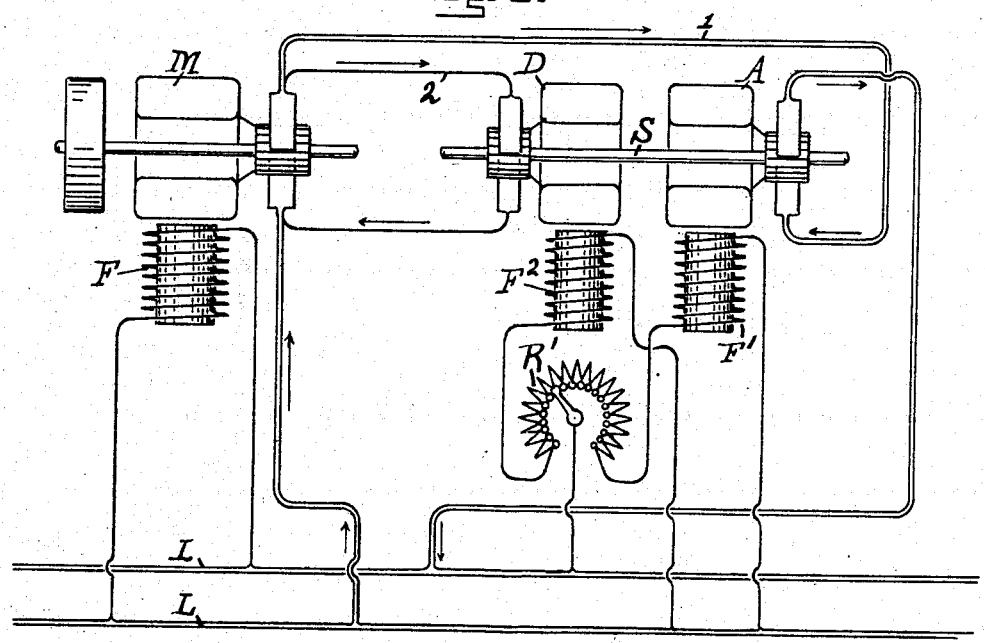
Witnesses:
Samuel W. Balch
H. H. Whitman
Inventor,
Schuyler S. Wheeler,
by Thomas Ewing Jr
Attorney.

UNITED STATES PATENT OFFICE.

SCHUYLER S. WHEELER, OF NEW YORK, N. Y., ASSIGNOR TO HARRY WARD LEONARD, OF EAST ORANGE, NEW JERSEY.

REGULATION OF DYNAMO-ELECTRICAL MACHINERY.

SPECIFICATION forming part of Letters Patent No. 673,345, dated April 30, 1901.

Application filed September 24, 1894. Serial No. 523,911. (No model.)

*To all whom it may concern:*

Be it known that I, SCHUYLER S. WHEELER, a citizen of the United States of America, residing in the city, county, and State of New York, have invented certain new and useful Improvements in Regulation of Dynamo-Electrical Machinery, of which the following is a specification.

The object is to provide means for regulating motors connected to a constant-potential feed-circuit without using so large resistance-coils as are required by methods now in use by mechanism which controls the speed of the motor without changing the potential of the main circuit and which can all be located at the point where the motor is working.

The invention consists, essentially, in controlling the drop of potential in the armature of the working motor by introducing into the circuit with the armature of the working motor in series the armature of a second or regulating motor and providing means for controlling the electromotive force of the regulating motor preferably by letting it drive a dynamo-armature; and my invention, in addition to the foregoing, consists in employing the current generated in the dynamo-armature to help drive the working motor. In practice I sometimes employ as the regulator a "dynamo-motor," by which I mean a machine having motor-armature coils and dynamo-armature coils mounted on the same shaft in a common field, so that the compound armature can be driven by current fed through the motor-coils and current can be generated by the dynamo-coils by revolution of the armature. Sometimes, however, I use separate motor and dynamo armatures mechanically coupled together.

In the accompanying sheet of drawings, which forms a part of this specification, Figure 1 is a diagrammatic view of my invention, and Fig. 2 is a similar view of a modification thereof.

In Fig. 1 the field-coils F of the working motor and the field-coils F' of the dynamo-motor, each consisting of a single set of coils, are connected in multiple to the leads L L. The armature M of the working motor and the motor coils or armature A of the dynamo-motor are connected in series in a circuit 1, which is connected to the leads in multiple with respect to the field-coil circuits. The dynamo coils or armature D of the dynamo-motor and a rheostat R are connected in series in a local circuit 2, which branches off from the circuit 1 at the brushes of the armature M.

In Fig. 2 the same reference characters are used as in Fig. 1 wherever the parts are identical. The differences in the two systems are that in Fig. 2 there is no rheostat in the circuit with the dynamo-armature, that the motor and dynamo armature windings are on separate cores, and that the fields and the field-coils of the dynamo-motor are divided into two parts—one, F', serving as the field-coil of the motor-armature, and the other, $F^2$, serving as the field-coil of the dynamo-armature—the two coils being connected to the leads L L in multiple arc through a rheostat R', by which one field can be increased and the other diminished in intensity at will.

In both figures the motors are supposed to be so connected to the circuits that currents shall traverse their armatures in the directions indicated by arrows.

Having now briefly described the mechanical construction and electrical arrangement of the apparatus, I will discuss the principle of operation.

If two motors identical in construction and having their field-coils connected permanently with a constant-potential feed-circuit and their armatures connected to each other in series and then to the feed-circuit in multiple with respect to the field-coils are allowed to run free, each will generate counter electromotive force and the two electromotive forces will be equal and together will nearly equal the electromotive force of the feed-circuit. If the friction is the same in each, each machine will run at half-speed and the armatures will draw very little current from the feed-circuit; but with the ordinary inequalities of friction met with in practice among machines of the same size and type one motor will almost certainly run at full speed, thereby generating an electromotive force nearly equal to that of the circuit and the other cannot obtain sufficient energy to revolve it. It is therefore clear that if two machines are arranged as above suggested and one of them is allowed to run free and the other called upon to do work the system will not be operative; but if one motor is either loaded or made to work at a disadvantage by some device that can be controlled by the operator it may be used to regulate the other motor without unduly cutting off current from it. For example, a load can be thrown upon the regulating-motor and some means provided for adjusting the load, so as to slow down the regulating-motor to any necessary point to produce the desired speed in the working motor. This can be done by a brake, or the brushes of the regulating-motor can be shifted or its field weakened, so that its speed will have to be greater than that of the working motor to produce the same counter electromotive force, thus increasing the friction to be overcome by the armature of the regulating-motor or practically increasing its load; but in illustrating my invention I have herein presented an arrangement by which the work put upon the regulating-motor to slow it down is employed to assist the working motor. This I accomplish by the use of a dynamo-motor as the regulator. The dynamo-motor is practically running with no load when it is running with its dynamo-armature circuit open; but as soon as this is closed and the machine begins to generate current its motor-armature is being called upon to do work. The amount of current so generated is regulated by the resistance R in Fig. 1 or by regulating the fields of the motor and dynamo armatures of Fig. 2 by the resistance R' or by shifting the brushes. The current generated is carried through circuit 2 to the armature of the working motor in a direction agreeing with the main current and helps to drive the working motor. Thus the motor-armature of the regulating dynamo-motor can be slowed down to effect an increase of the power of the working motor by calling upon it to do work which assists in driving the working motor. There are certain conditions under which the ratio between the armatures of the dynamo-motor may differ from unity, but these in no wise affect the principle of the invention. The principle is the same in Fig. 2, the difference being that field-regulators are used to control the work of the motor-dynamo instead of a resistance in its dynamo-circuit. Thus if the motor-field is strong it will give a slow speed, and the dynamo-field being *nil* the dynamo will generate no current, the same as if resistance were all in its armature-circuit, and at the same time the motor with strong field will generate full counter electromotive force and practically deprive the working motor of current from the main circuit. If, on the other hand, the motor-field is weak, the speed will be high, and as the dynamo-field is strong a large current will be generated, and at the same time the motor-field being weak its electromotive force will be low, allowing increased electromotive force to reach the working motor from the main circuit.

It is obvious that a resistance R, such as above described as included in the circuit between the dynamo-armature of the dynamo-motor and the armature of the working motor, can be used to assist the rheostat R' in the regulation of a construction like that shown in Fig. 2.

I do not claim in combination with an electric motor a counter-electromotive-force regulator consisting of a second dynamo-electric machine whose armature is in series with the motor to be regulated and independent means for varying the counter electromotive force of the said second dynamo-electric machine, as I am not the first inventor thereof.

What I claim is—

1. The combination of a shunt-wound working motor and a shunt-wound regulating-motor, the armatures of the two motors being connected in series to the feed-circuit, and means for controlling the counter electromotive force of the regulating-motor to regulate the working motor, substantially as set forth.

2. The combination of a working motor and a regulating dynamo-motor, the armature of the working motor being connected to the feed-circuit in series with the motor-armature of the dynamo-motor, and being connected in a shunt-circuit in series with a rheostat and the dynamo-armature of the dynamo-motor, substantially as set forth.

3. The combination of a working motor, and a regulating dynamo-motor, a switch for simultaneously and inversely varying the strength of the fields in which the armatures of the dynamo-motor revolve, substantially as described.

4. The combination of a working motor and a regulating dynamo-motor, the armature of the working motor being in series with the motor-armature of the dynamo-motor in a circuit connected to the feed-circuit in multiple with respect to the fields of the motor and dynamo-motor, and the armature of the working motor being connected in a shunt-circuit in series with a rheostat and the dynamo-armature of the dynamo-motor, substantially as described.

5. The combination with a source of electric energy, of two electromotive-force-producing windings connected with said source, a translating device connected across one of said windings, and means for inversely varying the electromotive forces of said windings, substantially as set forth.

6. The combination with a source of electric energy, of two electromotive-force-producing windings connected with said source, a translating device connected across one of said windings, and means for simultaneously and inversely varying the electromotive forces of said windings, substantially as set forth.

7. The combination with a source of electric energy, of two dynamo-electric machines connected with said source, a translating device connected across the armature-terminals of one of said machines, and means for inversely varying the fields of said machines.

8. The combination with a source of electric energy, of two dynamo-electric machines connected with said source, a translating device connected across the armature-terminals of one of said machines, and means for simultaneously and inversely varying the fields of said machines.

9. The combination with a source of electric energy, of two dynamo-electric machines connected with said source, the field-magnets of said machines being connected in multiple across said source, a translating device connected across the armature-terminals of one of said machines, and means for inversely varying the fields of said machines.

10. The combination with a source of electric energy, of two dynamo-electric machines connected with said source, the field-magnets of said machines being connected in multiple across said source, a translating device connected across the armature-terminals of one of said machines, and means for simultaneously and inversely varying the field of said machines.

Signed by me in New York city, New York, this 19th day of September, 1894.

SCHUYLER S. WHEELER.

In presence of—
BELLE J. HAMILTON,
A. L. DOREMUS.